(12) United States Patent
Van Rensburg

(10) Patent No.: US 10,979,379 B2
(45) Date of Patent: Apr. 13, 2021

(54) DESTINATION ADDRESSING COMMUNICATIONS ENVIRONMENT

(71) Applicant: RingCentral, Inc., Belmont, CA (US)

(72) Inventor: Christopher Van Rensburg, Foster City, CA (US)

(73) Assignee: RingCentral, Inc., Belmont, CA (US)

( * ) Notice: Subject to any disclaimer, the term of this patent is extended or adjusted under 35 U.S.C. 154(b) by 30 days.

(21) Appl. No.: 16/146,548

(22) Filed: Sep. 28, 2018

(65) Prior Publication Data

US 2020/0106733 A1 Apr. 2, 2020

(51) Int. Cl.
*H04L 12/58* (2006.01)

(52) U.S. Cl.
CPC .............. *H04L 51/28* (2013.01); *H04L 51/12* (2013.01); *H04L 51/24* (2013.01)

(58) Field of Classification Search
CPC .......... H04L 51/28; H04L 51/12; H04L 51/24
See application file for complete search history.

(56) References Cited

U.S. PATENT DOCUMENTS

| | | | |
|---|---|---|---|
| 8,326,634 B2 | 12/2012 | Di Cristo et al. | |
| 9,357,060 B2 | 5/2016 | Canto Fuertes et al. | |
| 2002/0123904 A1* | 9/2002 | Amengual | G06Q 30/0256 709/223 |
| 2005/0041266 A1* | 2/2005 | Silverbrook | G06Q 10/00 358/1.15 |
| 2005/0088704 A1* | 4/2005 | Vaschillo | H04N 1/32379 358/402 |
| 2006/0256959 A1* | 11/2006 | Hymes | H04M 1/72547 379/433.04 |
| 2006/0293903 A1* | 12/2006 | Ramanathan | G06Q 30/0257 709/206 |
| 2006/0293904 A1* | 12/2006 | Ramanathan | G06Q 10/00 709/206 |
| 2006/0293905 A1* | 12/2006 | Ramanathan | G06Q 10/10 709/206 |
| 2008/0189370 A1* | 8/2008 | Adams | H04L 51/08 709/206 |
| 2008/0216092 A1* | 9/2008 | Serlet | H04L 51/18 719/315 |
| 2008/0222710 A1* | 9/2008 | Blagsvedt | G06F 3/04817 726/7 |
| 2009/0013043 A1* | 1/2009 | Tan | G06Q 10/107 709/205 |

* cited by examiner

*Primary Examiner* — Ranodhi Serrao

(57) ABSTRACT

A method includes receiving a user input associated with a recipient of an electronic message. The user input is identification facilitating data that may facilitate identifying a recipient of the electronic message, and may include objects such as media files, qualifiers for how such objects relate to a recipient or may facilitate identifying a recipient, qualifiers regarding specific aspects of the objects and how such aspects may relate to a recipient or facilitate identifying a recipient. The user input is different from an address associated with the recipient of the electronic message and is further different from a name of the recipient. The method further includes resolving the user input against data stored at one or more servers to identify the address of the recipient of the electronic message. The method further includes populating the address of the recipient in a corresponding addressing field of the electronic message.

17 Claims, 9 Drawing Sheets

DESTINATION ADDRESSING COMMUNICATIONS ENVIRONMENT

TECHNICAL FIELD

The present disclosure relates generally to the field of computer supported communications environment between a sender and a recipient. More specifically, and without limitation, this disclosure relates to systems and methods for addressing communication messages to a recipient without prior knowledge of the recipient's address.

BACKGROUND

Electronic messaging has become a prevalent part of daily life. However, traditional communication systems require the user to have prior knowledge of the recipient's address, e.g., email address, phone number, IP address, etc., or to have the ability to look up the recipient's address by searching or querying a centralized system such as a company directory, address book, etc. Searching or querying for the recipient's address may not be feasible because the identity of the recipient may be unknown, or the user may not be part of the organization where the recipient belongs such that search and query can be performed. For example, a considerate passerby may wish to communicate to the owner of a vehicle parked with the lights on to prevent the battery depletion. As another example, a considerate passerby may wish to communicate to the owner of a parked vehicle that the owner's pet is in the vehicle with the windows rolled up in the heat of the summer, to save the pet from heatstroke and fatal dehydration. In yet another example, a user of a network may notice severe delay in communication but may not know the identity or the address of the technical person to address the concern to. In yet another example, a considerate passerby may wish to communicate to an owner of a house an issue with water/electricity/fire but may not know the identify or the address of the person residing in the house. As another example, a passerby may notice an issues with an electric pole or a pot hole but may not know how and to whom to reach out in order to report the problem. Under the conventional system, the user is unable to communicate to the intended recipient because the address is unknown and not searchable.

SUMMARY

According to some embodiments, it is desirable to identify the address of an intended recipient (a way of communicating and reach the intended recipient) without prior knowledge of the recipient's address or name, or without the ability to search for it through traditional means, e.g., look up in address directory, company directory, etc. According to some example embodiments, a method includes receiving a user input that can be used in identifying a recipient of an electronic message. The user input is identification facilitating data; that is, the user input comprises data that may facilitate identifying a recipient of the electronic message, and may include objects such as media files, as well as qualifiers for how such objects relate to a recipient or may facilitate identifying a recipient, or qualifiers regarding specific aspects of the objects and how such aspects may relate to a recipient or facilitate identifying a recipient. The identification facilitating data may in some cases comprise a relationship to the recipient, such as in the case of a picture of the dog they own. In other examples, the identification facilitating data may be a natural language expression that can be resolved to a recipient, such as "the first person to log in at their desk this morning", and this address may be entered for a message that is sent before anyone has logged in at their desk and only resolves to a recipient when the requisite is met, so the data facilitates identifying the recipient. In another example, the identification facilitating data may be directed to "The last person to leave the office last night" and the message may be "You left all the lights on. Please remember in future to turn the lights off if you are the last one to leave. Thanks." The user input is different from an address associated with the recipient of the electronic message and is further different from a name of the recipient. The method further includes resolving the user input against data stored at one or more servers to identify the address of the recipient of the electronic message. The method further includes populating the address of the recipient in a corresponding addressing field of the electronic message.

In some embodiments, the method further includes applying permissioning logic rules to the identified address to identify and apply restrictions associated with the electronic message. The restrictions are selected from a group consisting of permitted time frame for transmission of the electronic message, content restrictions, geolocation coordinates, identity of the recipient, and mode of communication.

In some embodiments, the method further includes obfuscating the address of the recipient prior to populating the address, and wherein the populated address is obfuscated.

The user input is selected from a group consisting of a picture, a universal resource identifier, audio, geolocation coordinates, and natural language input. The user input is received through a graphical user interface of an electronic device. In some embodiments, the user input is a picture, and wherein the identifying aspect of the data is an object within the picture. According to some embodiments, the electronic message is selected from a group consisting of an electronic mail, and a text message.

These and other features and aspects of the concepts described herein may be better understood with reference to the following drawings, description, and appended claims.

DETAILED DESCRIPTION

Figure 1:
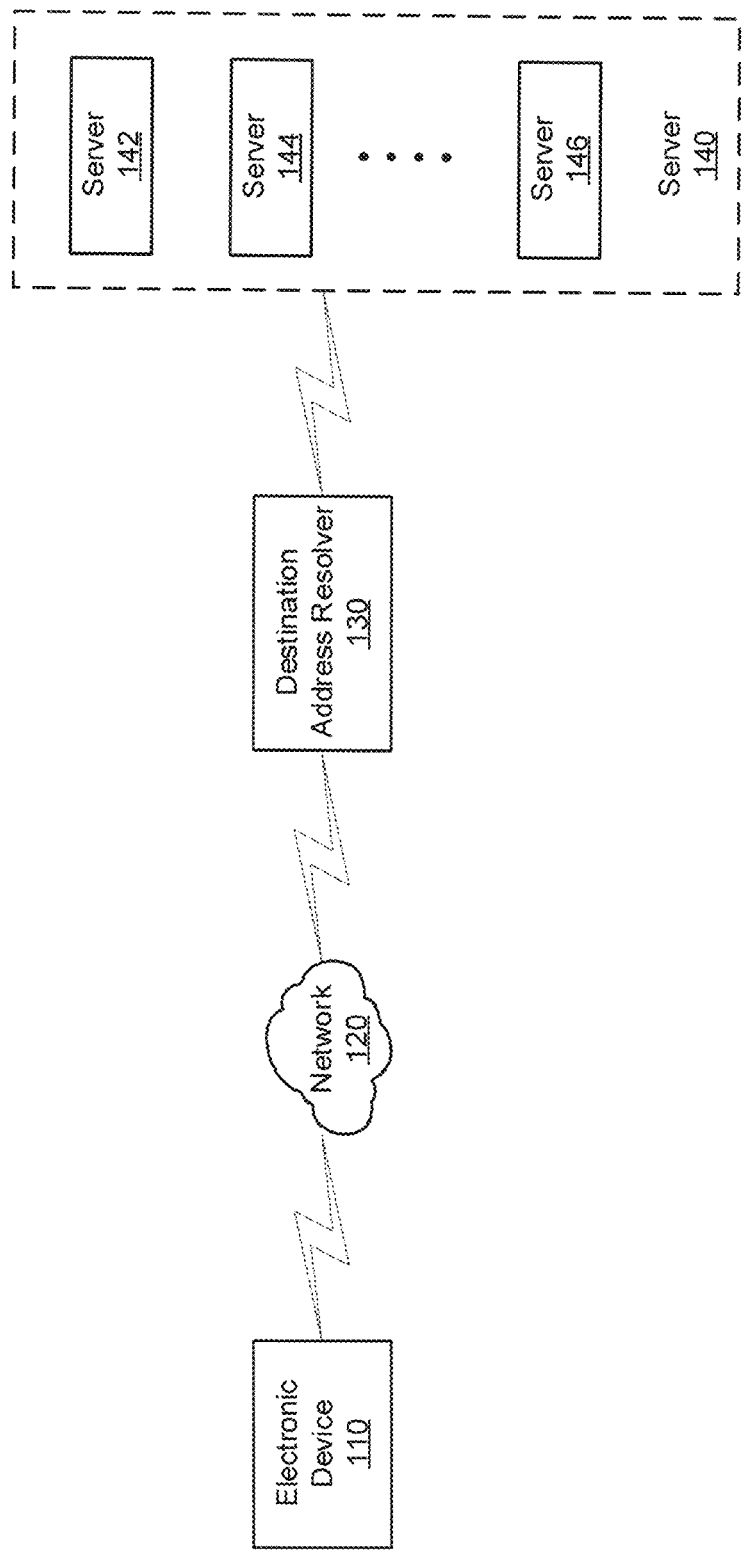
FIG. 1 is a block diagram depicting an example of a system suitable for identifying a recipient's address based on a user input according to some embodiments.

The example embodiments herein are directed to identifying and addressing messages to an intended recipient without prior knowledge of the recipient's address or name. The embodiments herein provide a mechanism through which messages can be addressed to objects, queries, or predicates. For example, an object is identified by taking a picture of the object, e.g., a vehicle, a dog in a vehicle, a license plate, a product, etc. The sender may further identify one or more objects by tapping on the picture. In some examples, the object is identified by qualifying the object by specifying the relationship of the object to the intended recipient of the message, e.g., driver of, owner of, etc.

The identification facilitating objects, queries, or predicates are then resolved against data stored on one or more servers and/or databases to identify the intended recipient. For example, the identification facilitating objects, queries, or predicates are resolved against a department of motor vehicle (DMV) database, a surveillance database at a parking lot, face recognition database, organization database, etc. In some embodiments, resolving the identification facilitating objects, queries, or predicates may be through an iterative process. The identified address can be used to send messages to the intended recipient. According to some examples, a set of permissioning rules is evaluated for the identified address in order to identify one or more restrictions on the message. Restrictions on the message may determine a permitted time frame for transmission of the electronic message, content restrictions, geolocation coordinates, identity of the recipient, mode of communication, frequency of messages that can be sent, length of messages that can be sent, etc. The restrictions may be set by the administrator of the system in addition to the recipient, for example, through the privacy setting of his smartphone. It is appreciated that the restrictions may further be based on the sender's prior behavior, e.g., whether the sender has used profanity in prior messages, whether the sender has received praise from other recipients in the past, title of the sender, relationship of the sender to the recipient, etc.

Accordingly, the embodiments provide mechanisms through which messages can be sent to an unknown recipient but yet intended recipient. Thus, the embodiments realize and satisfy a real need to have the ability of addressing an intended recipient without knowledge of the recipient's address or name.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "rendering" "utilizing", "resolving", "populating", "applying", "obfuscating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

It is appreciated that throughout the application messaging an intended recipient is described within the context of text messaging or emailing but references to the foregoing should not be construed as limiting the scope of the example embodiments as they are referenced merely for illustrative purposes. As understood by those skilled in the art, messaging communications environments can be implemented on different platforms that support online messaging, instant messenger, text messaging, email, or the like, with or without combination with additional applications, may be used to implement some of the embodiments of the present disclosure.

FIG. 1 is a block diagram depicting an example of a system suitable for identifying a recipient's address based on a user input according to some embodiments. The system includes an electronic device 110 coupled to a network 120. The network 120 is coupled to a destination address resolver 130 which is further coupled to server 140.

The electronic device 110 receives the user input. The user input identifies and/or qualifies an object. For example, the sender can use the electronic device 110 to take a picture of the object of interest, e.g., a vehicle, a dog in a vehicle, a license plate, a product, universal resource identifier (URI), etc. The object can be identified by tapping on the picture, e.g., tapping on a picture of a dog, a license plate, etc. In some examples, the object is identified by qualifying the object by specifying the relationship of the object to the intended recipient of the message, e.g., driver of, owner of, etc. It is appreciated that the user input is received through the electronic device 110 interface such as a microphone, a camera, keyboard, GUI (e.g., touchscreen, a dropdown menu, a textual input (in natural language), etc.), global positioning system (GPS) coordinates, etc. The electronic device 110 may be a smartphone, a computer, a fitness band or wearable device, augmented reality (AR) device, etc.

The received user input is subsequently transmitted through network 120 to the destination address resolver 130. The destination address resolver 130 may include a processor or a controller that processes the received user input containing identification facilitating objects, queries, or predicates. The destination address resolver 130 resolves the received user input and its processed data against the data stored on the server 140. For example, the identification facilitating objects, queries, or predicates are resolved against a department of motor vehicle (DMV) database, a surveillance database at a parking lot, face recognition database, organization database, social platform database, governmental database, etc. In some embodiments, resolving the identification facilitating objects, queries, or predicates may be through an iterative process. It is appreciated that server 140 may include a plurality of servers such as server 142, 144, . . . , 146. Moreover, it is appreciated that the servers 142-146 may be centrally located or they may be part of a distributed computing environment, a cloud computing environment, a client server environment, hard drive, etc. It is appreciated that data transmission between the electronic device 110 through the network 120 to the destination address resolver 130, and the server 140 may be transmitted from one or more storage devices via one or more interfaces (e.g., via Integrated Drive Electronics (IDE), Serial AT Attachment (SATA), Small Computer System Interface (SCSI), Serial SCSI, Universal System Bus (USB), or the like) of a database or over one or more networks (e.g., the Internet, Local Area Network (LAN), Wi-Fi, 4G, or the like).

The destination address resolver 130 identifies the intended recipient by resolving the received user input against the server 140. The identified address can be used to send messages to the intended recipient. According to some embodiments, the processor of the electronic device 110 populates the identified address of the recipient on the GUI rendered by the processor or graphics unit on a display device, e.g., liquid crystal display (LCD), etc. Thus, the sender can send the desired message to the intended recipient without prior knowledge of the recipient's address or identity. In some embodiments, for privacy reasons, the identified address of the recipient is obfuscated from the sender.

Figure 2A:
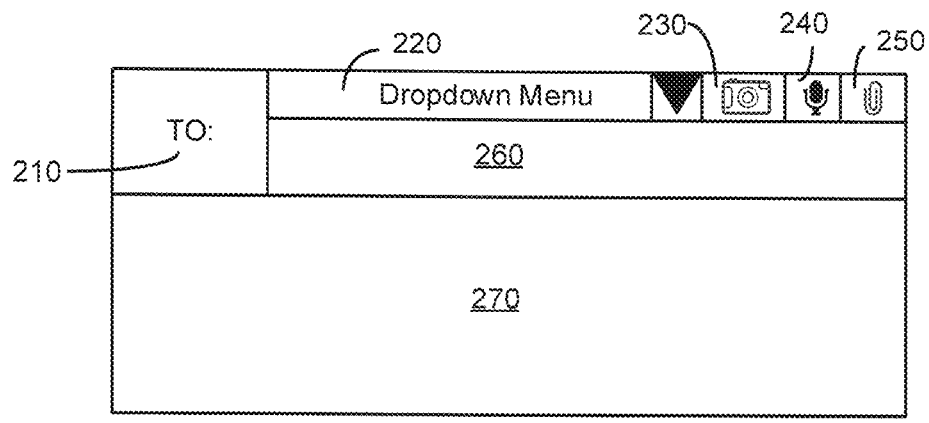
FIGS. 2A-2H are diagrams illustrating examples of Graphical User Interface (GUIs) that receives a user input according to some embodiments.

FIGS. 2A-2H are diagrams illustrating examples of GUIs that receive a user input according to some embodiments. FIG. 2A shows a diagram illustrating an example of a GUI configured to receive a user input to identify the address of the intended recipient. The GUI includes a "To" icon 210 for identifying the recipient of the message. The GUI further includes a dropdown menu 220 icon, a camera 230 icon, a microphone 240 icon, and an attachment icon 250. The GUI further includes a natural language portion 260 and messaging content 270 portion.

The dropdown menu 220 icon provides a set of options for the sender to qualify and specify the relationship of the recipient to the object, e.g., driver of, owner of, etc. The camera 230 icon enables the sender to take a picture or video of an object or objects in order to identify the recipient by way of the object or objects. For example, a picture of a license plate identifies the registered owner of the vehicle by way of the license plate number on the license plate and the associated registration record of the vehicle in which the registered owner is listed. In another example, the sender may take a picture of URI to identify the object/product. The microphone 240 icon enables the sender to identify the relationship of the object to the recipient of the message by speaking to the electronic device 110. The attachment 250 icon enables the sender to attach relevant documents to identify the relationship of the object to the recipient. An attached document may be a flyer, a whitepaper, an audio file such as music, a video file, etc. The natural language portion 260 enables the sender to type, e.g. on a keyboard, a natural language expression that can be used to identify the object and its relationship to the recipient. The sender types the intended content of the message in the messaging content 270 portion.

Figure 2B:
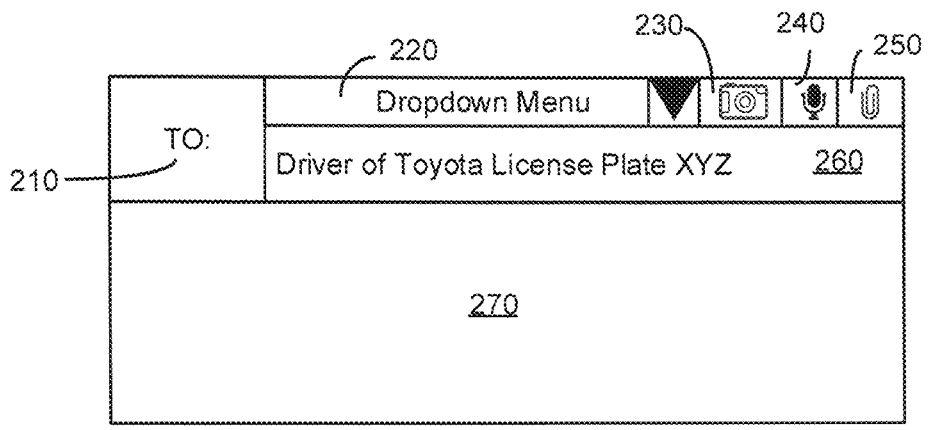

FIG. 2B shows a diagram illustrating an example of a GUI configured to receive a user input via the natural language portion 260. The natural language portion 260 enables the sender to identify the object and its relationship to the intended recipient via free textual input. For example, the sender may enter the text that identifies the object and its relationship to the intended recipient through a keyboard, touchscreen, etc. In this example, the sender intends to send a message to the driver/owner of a vehicle (Toyota®) with license plate XYZ.

Figure 2C:
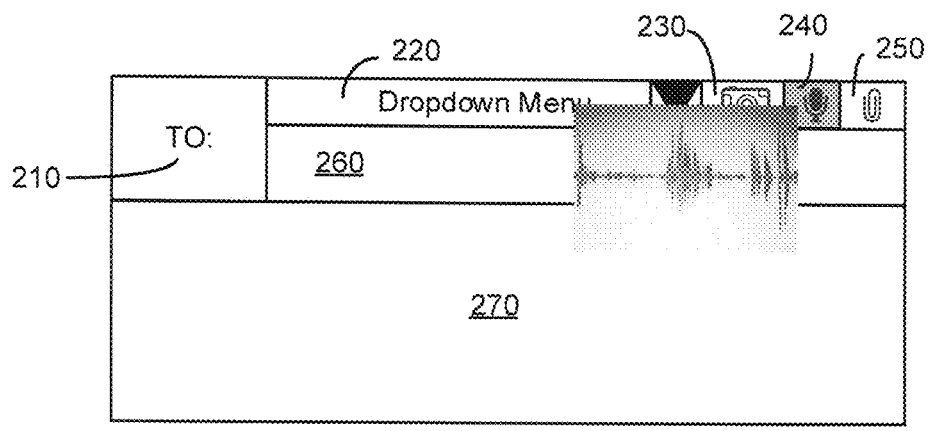

FIG. 2C shows a diagram illustrating an example of a GUI configured to receive a user input via its microphone. In this example, the microphone 240 icon is activated to enable the sender to identify the object and its relationship to the intended recipient by speaking to the electronic device 110. For example, the sender may speak "driver of the vehicle with a Maltese dog" in order to identify owner/driver of the vehicle.

Figure 2D:
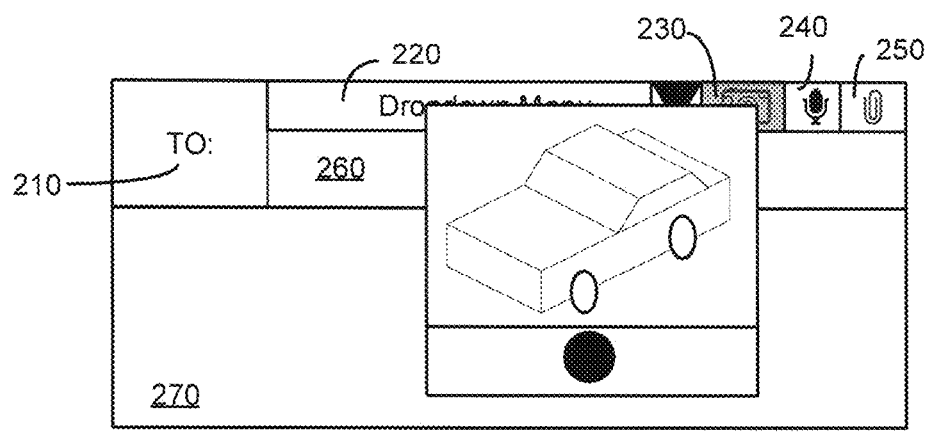
Figure 2E:
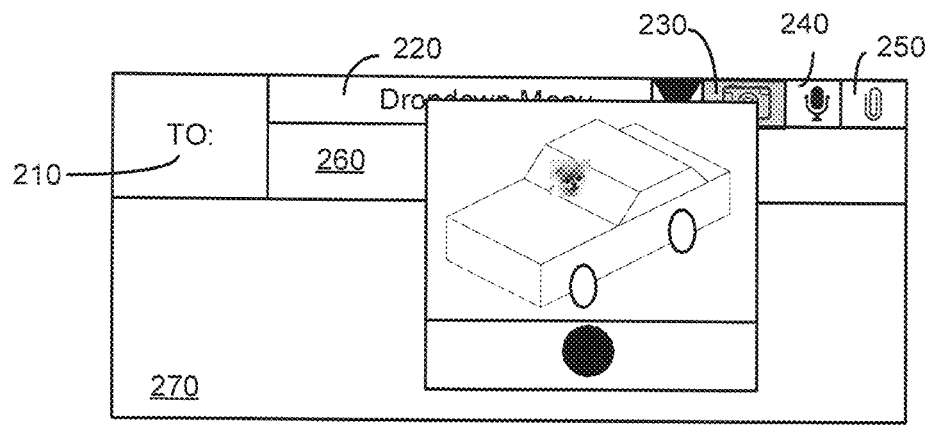

FIG. 2D shows a diagram illustrating an example of a GUI configured to receive a picture as user input via camera 230 icon. The camera 230 icon enables the sender to identify the object and its relationship to the intended recipient by taking a picture of an object. For example, the sender may take a picture of a vehicle in order to identify the relationship of the vehicle to the drive/owner of the vehicle. In this example, the sender activates the camera 240 icon in order to take a picture of the object, e.g., a vehicle. FIG. 2E is similar to FIG. 2D except that the object of interest is the dog trapped in the vehicle. It is appreciated that the object of interest may be selected by tapping on objects of interest once the picture is taken. In other examples, the objects of interest may be selected by drawing a box around them.

Figure 2F:
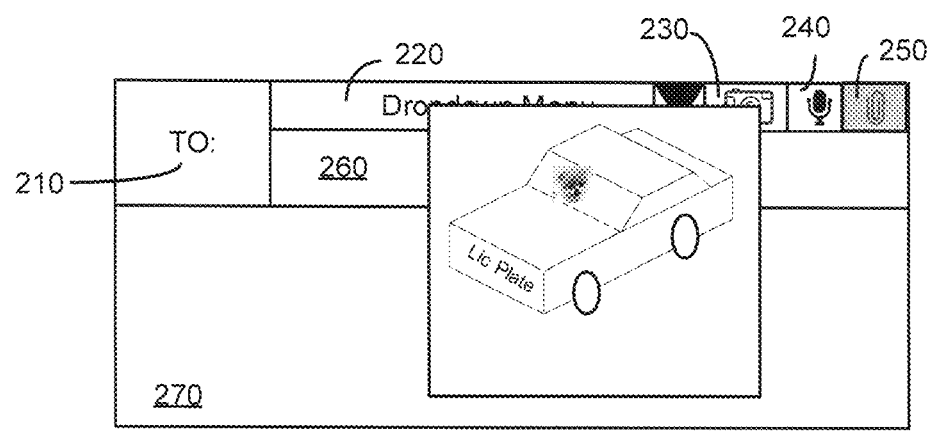

FIG. 2F shows a diagram illustrating an example of a GUI configured to receive a user input as an attachment. In this example, the attachment 250 icon is activated to enable the sender to identify the object and its relationship to the intended recipient by attaching a file of interest via the electronic device 110. It is appreciated that the attachment may be a picture, an audio file (music), a video, etc. In this example, the attached file is a picture of a vehicle with a dog inside it and where the license plate is visible. As discussed above, the objects of interest may be selected by tapping or drawing a box around them or through any other selectable means. For example, the objects of interest, the vehicle, the dog, and the license plate can be selected by tapping on them in the picture.

Figure 2G:
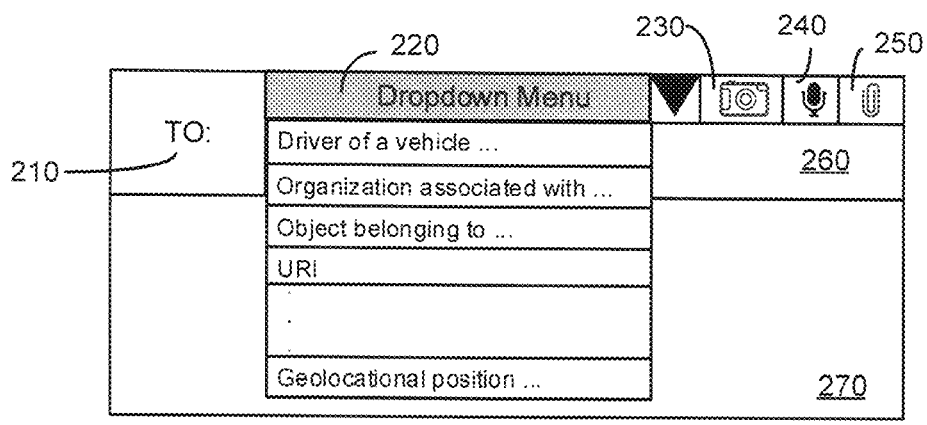

FIG. 2G shows a diagram illustrating an example of a GUI configured to receive a user input via its dropdown menu 220. In this example, the dropdown menu 220 icon is activated to enable the sender to select from a set of possible selections. For example, the dropdown menu may indicate "Driver of vehicle . . . " "Organization associated with . . . " "Object belonging to . . . " "URI", . . . , "Geolocational position . . . " in order to identify the object and its relationship to the intended recipient. The selection from the dropdown menu 220 may be accompanied with other methods of user input, e.g., natural language, picture, etc.

It is appreciated that while the embodiments above are described with respect to selection of a single object or one mechanism to input the desired object, a single recipient, etc., the embodiments are not limited thereto. For example, more than one object can be identified, and further, more than one method of input may be utilized, e.g., audio input may be accompanied with a picture as well as natural language input. Furthermore, more than one recipient may be addressed.

Figure 2H:
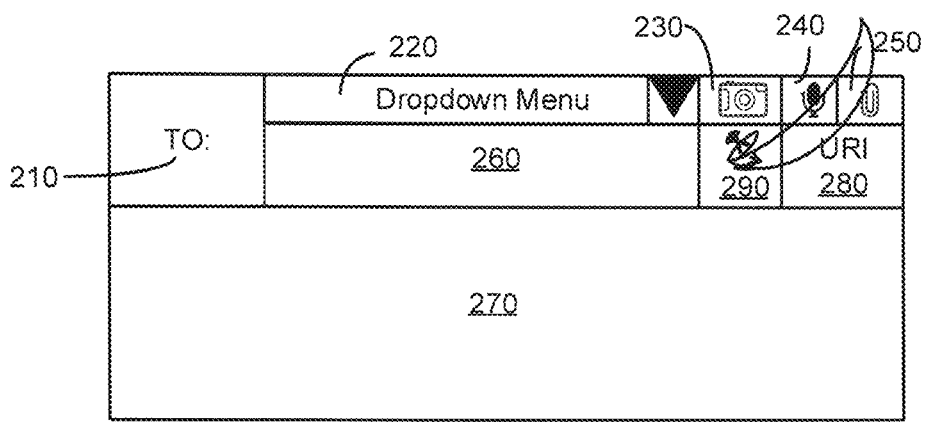

FIG. 2H shows a diagram illustrating an example of a GUI configured to receive a user input to identify the address of the intended recipient. In this example, the GUI in addition to the icons identified in FIG. 2A includes a URI 280 icon and a GPS coordinate 290 icon, Activating the URI 280 icon enables the sender to input a URI associated with an object/product of interest. As such, the sender may, for example, provide feedback on a product that the user has purchased or used from Amazon by inputting the URI for the product page for the purchased product. Moreover, utilizing the GPS coordinate 290 icon the sender can identify the location of interest and its relation to the intended recipient. In some embodiments, the sender can activate the GPS coordinate 290 icon to identify the location of interest. For example, the sender may see a small fire in a national park and may wish to notify the appropriate authorities and therefore may send the GPS coordinates of the location through the GPS coordinate 290 icon.

Figure 3:
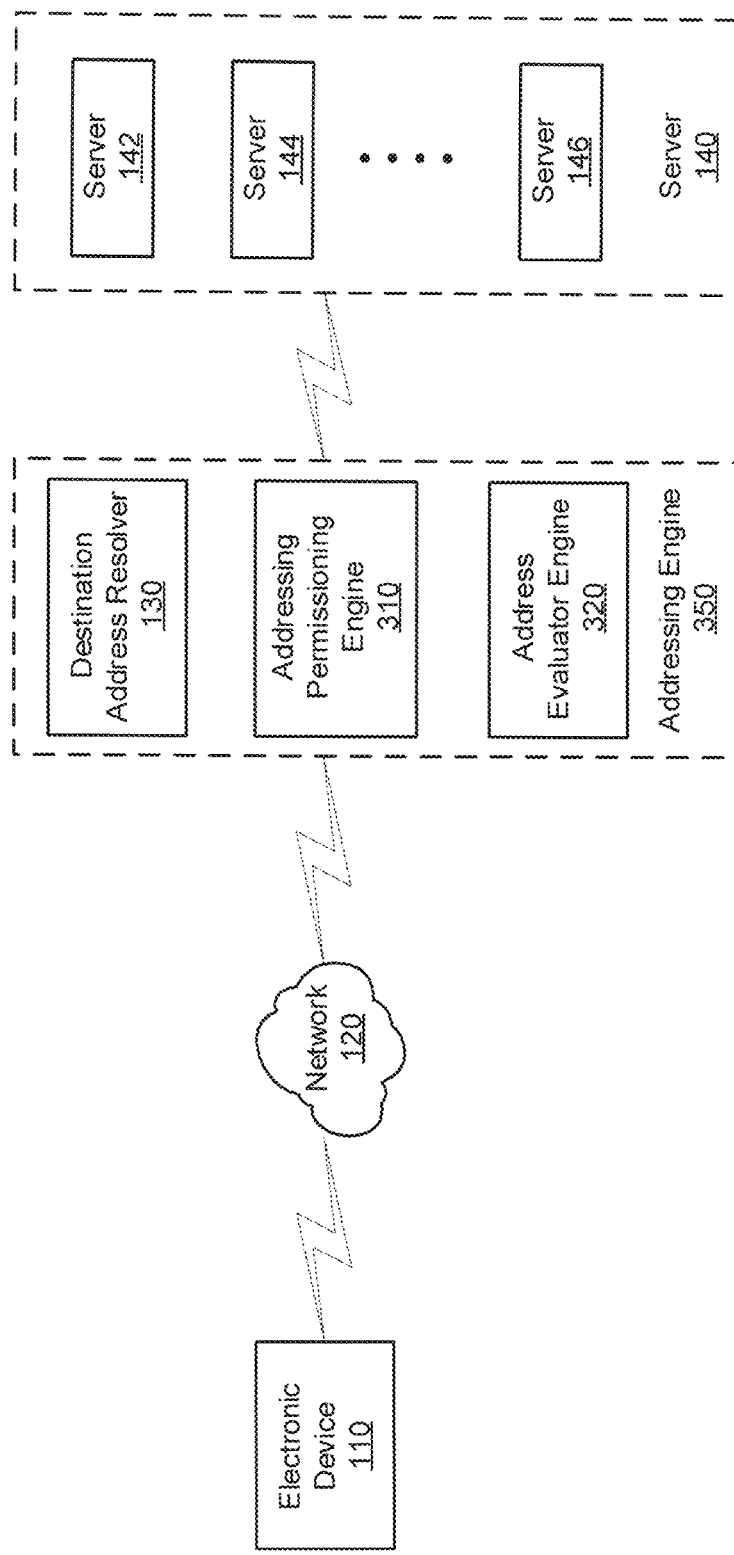
FIG. 3 is a block diagram depicting an example of a system suitable for identifying a recipient's address based on a user input according to some embodiments.

FIG. 3 is a block diagram depicting an example of a system suitable for identifying a recipient's address based on a user input according to some embodiments. FIG. 3 is substantially similar to FIG. 1 except that the destination address resolver 130 is further coupled with two additional components: the addressing permissioning engine 310, and the address evaluator engine 320. The destination address resolver 130, the addressing permissioning engine 310, and the address evaluator engine 320 may be integrated within the addressing engine 350. However, it is appreciated that the addressing engine 350 may be part of a distributed computing environment, a cloud computing environment, a client server environment, hard drive, etc. It is appreciated that data transmission may be from one or more storage devices via one or more interfaces (e.g., via Integrated Drive Electronics (IDE), Serial AT Attachment (SATA), Small Computer System Interface (SCSI), Serial SCSI, Universal System Bus (USB), or the like) of a database or over one or more networks (e.g., the Internet, Local Area Network (LAN), Wi-Fi, 4G, or the like).

According to some embodiments, the addressing permissioning engine 310 stores a plurality of permissioning logic rules for restricting the message. For example, the permissioning engine 310 may store rules for reducing inappropriate behavior and abuse of the messaging system. In other words, the permissioning engine 310 may consider the tone of the message, the propriety of the message such as whether offensive or polite language has been used, etc. The permissioning engine 310 may also consider the sender and the sender's past behavior as a factor in limiting the scope and mode of communication. The sender's past behavior may include prior messages, feedback received from prior recipients, frequency of prior messages, length of prior messages, etc. The permissioning engine 310 may further consider other factors such as title of the sender, association of the sender to the recipient, the subject matter and content of the message, etc. For example, the topic of messages that can be transmitted to a vehicle owner with his pet trapped inside may have different from the topic of messages between colleagues that work at the same company. Other rules may include limiting the length of a message, limiting the frequency of the messages from the same sender, limiting the content of the message to certain topics based on content of the message as well as relationship between the sender and the intended recipient, limiting the message based on time of the day the message is being sent, limiting the medium of communication to text or email or expanding it to audio and/or video, time frame for transmission of the electronic message, content restrictions, geolocation coordinates, identity of the recipient, relationship of the sender to the recipient, etc. The restrictions may be set by the administrator of the system in addition to the recipient setting restrictions, for example, through the privacy setting of his smartphone.

The set of permissioning rules stored in the addressing permissioning engine 310 is evaluated by the address evaluator engine 320. For example, the address evaluator engine 320 may include a processor for processing the restrictions from the addressing permissioning engine 310 to evaluate the mode of communication and any appropriate restriction on the content of the message. Thus, restrictions applicable to the identified address are determined.

Figure 4:
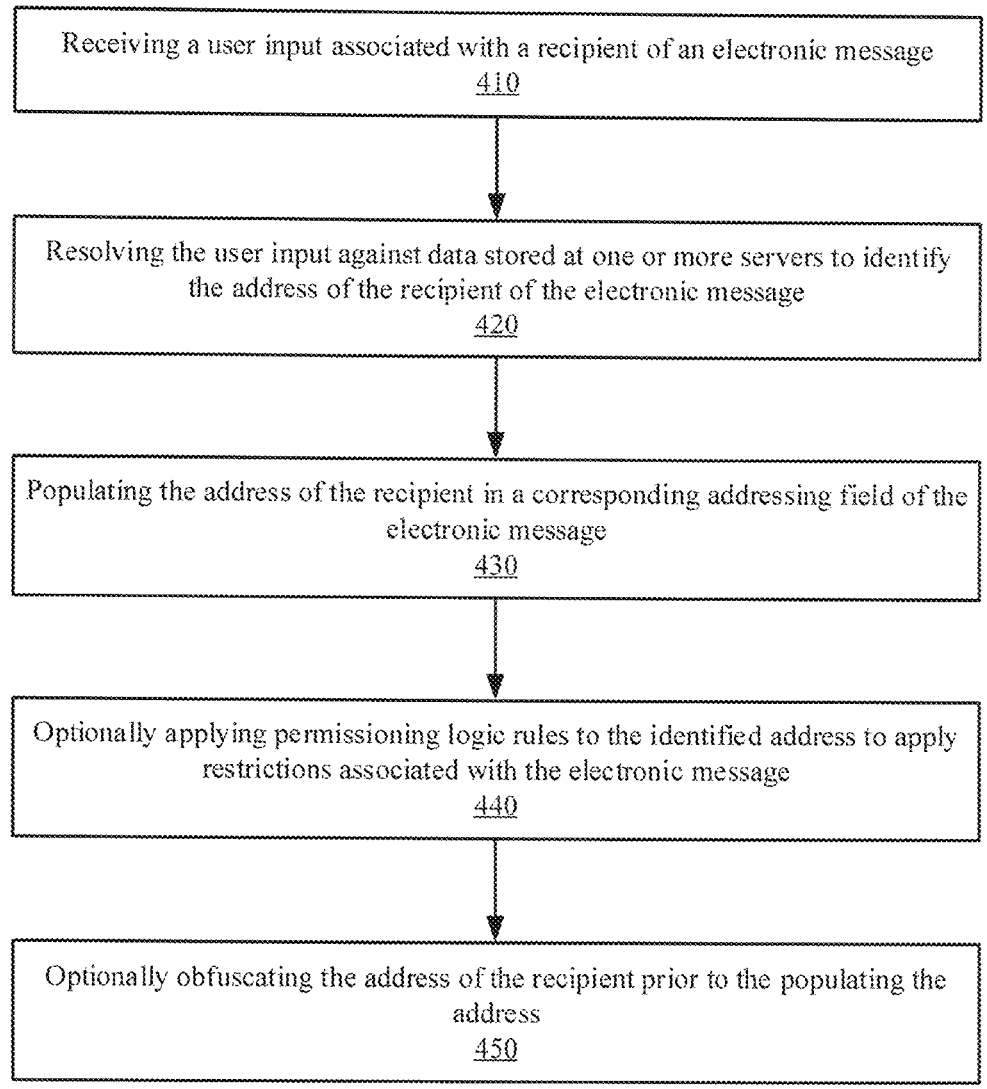
FIG. 4 is a flow chart illustrating an example of method flow for identifying an address of a recipient in accordance with some embodiments.

FIG. 4 is a flow chart illustrating an example of method flow for identifying an address of a recipient in accordance with some embodiments. At step 410, a user input associated with a recipient of an electronic message is received. As presented above, the user input may be received via the electronic device 110 and through various interfaces, e.g., GUI, camera, audio input, etc. The user input may be a picture, a universal resource identifier, audio, geolocation coordinates, natural language input, etc. that identifies an object and its relationship with the intended recipient of the message. The received user input is different from the address of the recipient and it is further different from the name of the recipient because they may be unknown to the sender.

At step 420, the user input is resolved against data stored at one or more servers to identify the address of the recipient of the electronic message. For example, as discussed above, the received user input may be transmitted to the destination address resolver 130, in some embodiments comprised by addressing engine 350, in order for the destination address resolver 130 to resolve the user input against data stored at server 140. Once the address of the recipient is identified, at step 430, the address of the recipient is populated in the corresponding addressing field of the electronic message.

At step 440, optionally permissioning logic rules are applied to the identified recipient address. Applying the permissioning logic rules applies suitable restrictions on the electronic message, as discussed with respect to FIG. 3. At step 450, optionally the identified address of the recipient is obfuscated prior to populating the address in order to protect the privacy of the recipient of the message.

Figure 5:
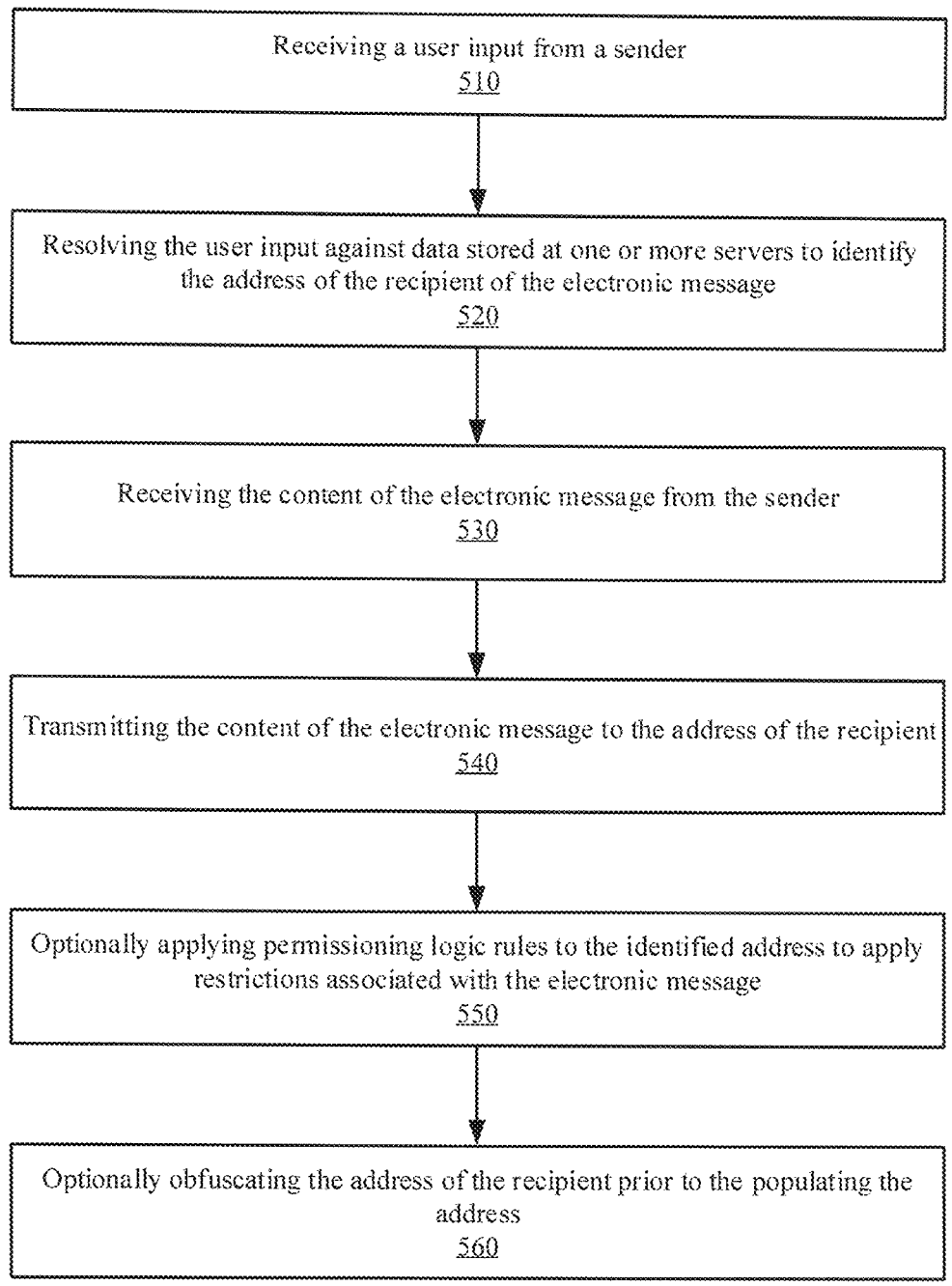
FIG. 5 is another flow chart showing an example of method flow for sending a message to a recipient in accordance with some embodiments.

FIG. 5 is another flow chart illustrating an example of method flow for sending a message to a recipient in accordance with some embodiments. At step 510, a user input is received from a sender. As discussed above with respect to FIGS. 1-4, the user input is identification facilitating data; that is, the user input comprises data that may facilitate identifying a recipient of the electronic message, and may include objects such as media files, as well as qualifiers for how such objects relate to a recipient or may facilitate identifying a recipient, or qualifiers regarding specific aspects of the objects and how such aspects may relate to a recipient or facilitate identifying a recipient. The user input is different from an address associated with the recipient of the electronic message and is further different from the name of the recipient because they may be unknown to the sender. As presented above, the user input may be received via the electronic device 110 and through various interfaces, e.g., GUI, camera, audio input, etc. The user input may be a picture, a universal resource identifier, audio, geolocation coordinates, natural language input, etc. that identifies an object and its relationship with the intended recipient of the message. The received user input is different from the address of the recipient and it is further different from the name of the recipient because they may be unknown to the sender. In some embodiments, the user input defines the relationship of the intended recipient of the electronic message to the intended content of the electronic message At step 520, the user input is resolved against data stored at one or more servers to identify the address of the recipient of the electronic message. For example, as discussed above, the received user input may be transmitted to the destination address resolver 130, in some embodiments comprised by addressing engine 350, in order for the destination address resolver 130 to resolve the user input against data stored at server 140. At step 530, the content of the electronic message is received from the sender, as described in FIGS. 1-3. At step 540, once the address of the recipient is identified, the content of the electronic message is transmitted to the intended recipient of the message. It is appreciated that the sender may or may not be aware of the actual recipient's address.

At step 550, optionally permissioning logic rules are applied to the identified recipient address and the electronic message. Applying the permissioning logic rules applies suitable restrictions on the electronic message, as discussed with respect to FIG. 3. At step 560, optionally the identified address of the recipient is obfuscated prior to populating the address in order to protect the privacy of the recipient of the message.

Accordingly, the system allows addressing messages to an unknown yet intended recipient without knowledge of the recipient's address. As one example, the embodiments described enable a company employee who notices a parked vehicle with its light on to send a message without knowing the owner of the vehicle to notify them of the lights being on. As presented above with respect to FIGS. 1-5, the employee may select a special addressing option that involves taking a picture of the vehicle and/or license plate. In other examples, the employee can qualify the object, e.g., vehicle, by indicating "the driver of vehicle . . . ". Alternatively, the employee can make a selection through a dropdown menu, through audio input, etc. as presented above in FIGS. 2A-2H. In yet other examples, the employee can select the object using AR goggles and by gazing at the object and/or person. In some examples, the employee can make a selection of the object by clicking, tapping, or other similar means.

As another example, an employee of a technology company noticing performance issues after hours can report the problem without knowledge of the recipient's address, in a similar fashion as described above.

In one example according to some embodiments, the user can send messages regarding a product, a person, organization, etc., by using a URI associated with the product. The URI can be captured by taking a picture of it or by copying it from the location bar of a Web browser.

As yet another example, a member of the executive staff of a company can send a message to the CEO of the company by stopping by the CEO's office and by activating the user input through AR goggles and by gazing at the office door of the CEO that may include certain identification facilitating information such as CEO's name or the word CEO, geographical location of the member, etc. Given the relationship between the sender and the CEO and the fact that the sender is a member of the executive staff the message may be transmitted unrestricted, whereas for other employees the permissioning logic rules may restrict the message.

In another example, a patron at a restaurant can utilize the mechanisms of the embodiments described to send a message that the patron would like some sparkling water. In this example, the patron may enter a user input of GPS coordinates. The GPS coordinates may be complemented with other information in some embodiments, e.g., natural language indicating which table, etc. As such, a message can be sent to expedite the service at the restaurant.

In one example, a police officer witnessing a traffic violation can send a message to the violator by entering a user input, e.g., license plate, make and model of the vehicle, etc., via various input means, e.g., GUI, camera, microphone, etc. Thus, the message can be transmitted to the violator. It is appreciated that the permissioning logic rules may send the message unrestricted given the authority of the police officer. In other examples, the messages between two drivers may be restricted based on factors described above in FIG. 3. In one example, a driver of a vehicle may notice a burnt-out tail light of another vehicle and can use the addressing scheme according to the described embodiments to notify the driver of the vehicle with the burnt-out tail light that the tail light is not working. In contrast, however, the permissioning logic rules that may apply to the situation of the driver of one vehicle messaging the driver of another vehicle may restrict the one driver from sending an angry message to the other driver that may constitute an act of road rage.

In yet another example, at an airport a passenger noticing a suspicious item of luggage can send a message to the appropriate personnel at the airport by entering a user input, e.g., description of the luggage, description of the individual dropping the luggage off, location of the luggage, etc., via various input means, e.g., GUI, camera, microphone, etc. Thus, the message can be transmitted to the appropriate security personnel, without the passenger having to first know an address for such appropriate security personnel. It is appreciated that the permissioning logic rules may restrict the message based on the topic, association of the sender to the intended recipient, etc. It is appreciated that the message may also be restricted based on the propriety of the language used, as discussed above.

In one example, a member of a gym may find an item. The member can send a message to appropriate gym personnel and/or to gym members notifying them of the found item. It is appreciated that the user input may include a description of the found item, the location where it was found, etc., via various input means, e.g., GUI, camera, microphone, etc. The user input is resolved against a database containing relevant information. For example, the database may identify potential members that were present at the gym at the time that the item was found or potential members that were present at the gym an hour before to an hour after the item was found. Thus, the message can be transmitted to the appropriate gym personnel and/or gym members, without the gym member who discovered the item first having to know an address for such appropriate gym personnel and/or gym members. It is appreciated that the permissioning logic rules may restrict the message based on the topic, association of the sender to the intended recipient, etc. For example, the sender's message may be restricted to topics related to the lost item and content related to advertising, self-promotion, etc., may be restricted. It is appreciated that the message may also be restricted based on the propriety of the language used, as discussed above.

In some examples, making last minute reservations at restaurants may be difficult. However, a potential patron can enter a user input such as type of food, number of guests, time of interest, availability, etc., via various input means, e.g., GUI, camera, microphone, etc. The user input is resolved against a database containing relevant information, e.g., database associated with Yelp® is an example. Once resolved, one or more restaurants can be identified as the recipients. The message can be sent and responded to by the restaurant if they have availability. It is appreciated that the permissioning logic rules may restrict the message based on the topic, association of the sender to the intended recipient, etc. For example, the sender's message may be restricted to topics related to food and restaurants and content related to advertising, self-promotion, criticizing content, etc. may be restricted. It is appreciated that the message may also be restricted based on the propriety of the language used, as discussed above.

In yet another example, traffic and congestion have become a prevalent problem in big cities. Thus, appropriate partnership between drivers and potential passengers is becoming more and more important and somewhat addressed by drive sharing companies such as Uber® and Lyft®. Unfortunately, drive sharing companies do not address traffic congestion. Using the embodiments described above, however, a passenger searching for a ride can message potential drivers. For example, the passenger searching for a ride can indicate the pickup address and the drop off address as the user input. The information can be resolved against a database of potential drivers using applications, e.g., Waze®, Google® map, etc., identify potential drivers that are driving in the vicinity of the pickup location and are destined in the vicinity of the drop off location. Once resolved, the message can be sent by the passenger searching for a ride to potential drivers and an interested driver can respond and pick up the passenger, thereby alleviating traffic congestion. It is appreciated that the permissioning logic rules may restrict the message based on the topic, association of the sender to the intended recipient, etc. For example, the sender's message may be restricted to topics related to driving, pickup location, drop off location, etc., and content related to advertising, self-promotion, criticizing information, etc. may be restricted. It is appreciated that the message may also be restricted based on the propriety of the language used, as discussed above.

As yet another example, in big cities looking for parking is part of daily life. Using the embodiments described above enables the drivers to exchange messages in order to quickly and efficiently find parking. For example, a driver looking for a parking spot can message drivers nearby with his/her request. It is appreciated that the sender, e.g., driver looking for parking, etc., can indicate the location where the driver is looking for available parking spot. As presented above, the user input may be via various input means, e.g., GUI, camera, microphone, etc. User input may be resolved against a database to identify drivers nearby leaving their parking spot, thereby making them available for others. Once resolved, the message can be sent by the driver searching for a parking spot to potential drivers leaving thereby making their parking spot available for others, thereby alleviating the problem of looping around to look for parking. It is appreciated that the permissioning logic rules may restrict the message based on the topic, association of the sender to the intended recipient, etc. For example, the sender's message may be restricted to topics related to driving, location, GPS coordinate, etc., and content related to advertising, self-promotion, etc. may be restricted. It is appreciated that the message may also be restricted based on the propriety of the language used, as discussed above.

As another example, a driver leaving his/her parking spot can blast out a message to potential drivers looking for a parking spot nearby. It is appreciated that the sender, e.g., driver leaving a parking spot, etc., can indicate the location where the driver is leaving from, making it available for other vehicles. As presented above, the user input may be via various input means, e.g., GUI, camera, microphone, etc. User input may be resolved against a database to identify drivers nearby searching for a parking spot. Once resolved, the message can be sent by the driver leaving a parking spot to potential drivers searching for a parking spot, thereby alleviating the problem of looping around to look for parking. It is appreciated that the permissioning logic rules may restrict the message based on the topic, association of the sender to the intended recipient, etc. For example, the sender's message may be restricted to topics related to driving, location, UPS coordinate, etc., and content related to advertising, self-promotion, etc. may be restricted. It is appreciated that the message may also be restricted based on the propriety of the language used, as discussed above.

Figure 6:
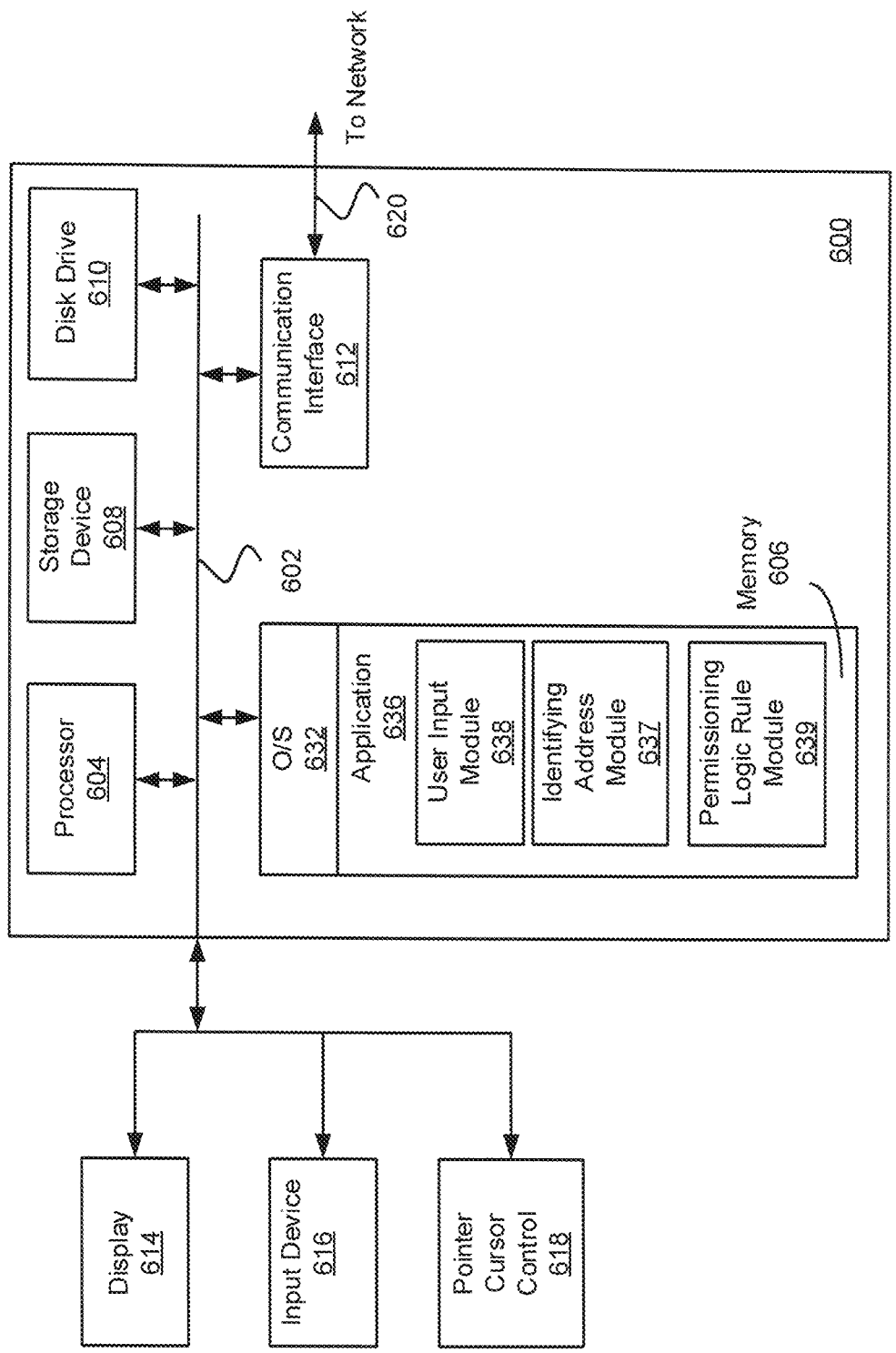
FIG. 6 is a block diagram depicting an example of computer system suitable for creating online chats in accordance with some embodiments.

Referring now to FIG. 6, an exemplary block diagram of a computer system suitable for addressing messages in accordance with some embodiments is shown. In some examples, computer system 600 can be used to implement computer programs, applications, methods, processes, or other software to perform the above-described techniques and to realize the structures described herein. Computer system 600 includes a bus 602 or other communication mechanism for communicating information, which interconnects subsystems and devices, such as a processor 604, a system memory ("memory") 606, a storage device 608 (e.g., ROM), a disk drive 610 (e.g., magnetic or optical), a communication interface 612 (e.g., modem or Ethernet card), a display 614 (e.g., CRT or LCD), an input device 616 (e.g., keyboard), and a pointer cursor control 618 (e.g., mouse or trackball). In one embodiment, pointer cursor control 618 invokes one or more commands that, at least in part, modify the rules stored, for example in memory 606, to define the electronic message preview process.

According to some examples, computer system 600 performs specific operations in which processor 604 executes one or more sequences of one or more instructions stored in system memory 606. Such instructions can be read into system memory 606 from another computer readable medium, such as storage device 608 or disk drive 610. In some examples, hard-wired circuitry can be used in place of or in combination with software instructions for implementation. In the example shown, system memory 606 includes modules of executable instructions for implementing an operation system ("O/S") 632, an application 636 (e.g., a host, server, web services-based, distributed (i.e., enterprise) application programming interface ("API"), program, procedure or others). Further, application 636 includes a module of executable instructions for receiving user input module 638 that receives user input such as natural language text, picture, audio, video, etc., as well as modules of executable instructions for identifying address module 637 to identify intended recipient's address of the message and a permissioning logic rule module 639 that stores rules for restricting the message. It is appreciated that the received user input is resolved against a database that contains data associated with potential recipients and their respective addresses.

The term "computer readable medium" refers, at least in one embodiment, to any medium that participates in providing instructions to processor 604 for execution. Such a medium can take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 600. According to some examples, two or more computer systems 600 coupled by communication link 620 (e.g., LAN, PSTN, or wireless network) can perform the sequence of instructions in coordination with one another. Computer system 600 can transmit and receive messages, data, and instructions, including program code (i.e., application code) through communication link 620 and communication interface 612. Received program code can be executed by processor 604 as it is received, and/or stored in disk drive 610, or other non-volatile storage for later execution. In one embodiment, system 600 is implemented as a hand-held device. But in other embodiments, system 600 can be implemented as a personal computer (i.e., a desktop computer) or any other computing device. In at least one embodiment, any of the above-described delivery systems can be implemented as a single system 600 or can be implemented in a distributed architecture including multiple systems 600.

In view of the foregoing, examples of identifying address(es) of the intended recipient are described without knowledge of the address or the identity of the recipient(s). Address identifying systems can be implemented using real-time interfaces that are configured to control and manage communication dynamically over an IP network. Further electronic messaging systems can be implemented on computer readable medium using the modules as described above to preview screen sharing content. The described techniques can be used to emulate other electronic messaging technologies by receiving messages with generated message preview independent of content storing.

In other examples, the systems, as described above can be implemented from a personal computer, a computing device, a mobile device, a mobile telephone, a facsimile device, a personal digital assistant ("PDA") or other electronic device. Various embodiments can apply to any electronic screen sharing.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
receiving a user input that identifies a physical object in a picture, and wherein the physical object is associated with a recipient of an electronic message and wherein the physical object is different from the recipient of the electronic message and further wherein the recipient of the electronic message is absent in the picture, and wherein a physical proximity of the recipient of the electronic message is independent from a physical proximity of the physical object, wherein the user input is identification facilitating data associated with a recipient of the electronic message, wherein the user input is different from an address associated with the recipient of the electronic message and wherein the user input is different from a name of the recipient;
resolving the user input against data stored at one or more servers to identify the address of the recipient of the electronic message;
populating the address of the recipient in a corresponding addressing field of the electronic message; and
applying permission logic rules to the identified address to apply restrictions associated with the electronic message wherein the restrictions include a permitted time frame for transmission of the electronic message.

2. The method as described in claim 1, wherein the restrictions is selected from a group consisting of permitted time frame for transmission of the electronic message, content restrictions, geolocation coordinates, identity of the recipient, and mode of communication.

3. The method as described in claim 1 further comprising obfuscating the address of the recipient prior to populating the address, and wherein the populated address is obfuscated.

4. The method as described in claim 1, wherein the user input is selected from a group consisting of a picture, audio, geolocation coordinates, and natural language input.

5. The method as described in claim 1, wherein the user input is received through a graphical user interface of an electronic device.

6. The method as described in claim 1, wherein the user input is a picture, and wherein the identification facilitating data is an object within the picture.

7. The method as described in claim 1, wherein the electronic message is selected from a group consisting of an electronic mail, and a text message.

8. A method comprising:
receiving a user input from a sender, wherein the user input identifies a physical object in a picture and is associated with a recipient of an electronic message and wherein the physical object is different from the recipient of the electronic message and further wherein the recipient of the electronic message is absent in the picture, and wherein a physical proximity of the recipient of the electronic message is independent from a physical proximity of the physical object, wherein the user input is identification facilitating data associated with a recipient of the electronic message, wherein the user input is different from an address associated with the recipient of the electronic message and wherein the user input is different from a name of the recipient;
resolving the user input against data stored at one or more servers to identify the address of the recipient of the electronic message;
receiving a content of the electronic message from the sender;
transmitting the content of the electronic message to the address of the recipient; and
applying permission logic rules to the identified address to apply restrictions associated with the electronic message, wherein the restrictions include a permitted time frame for transmission of the electronic message.

9. The method as described in claim 8, wherein the restrictions is selected from a group consisting of permitted time frame for transmission of the electronic message, content restrictions, geolocation coordinates, identity of the recipient, and mode of communication.

10. The method as described in claim 8 further comprising obfuscating the address of the recipient prior to populating the address, and wherein the populated address is obfuscated.

11. The method as described in claim 8, wherein the user input is selected from a group consisting of a picture, audio, geolocation coordinates, and natural language input.

12. The method as described in claim 8, wherein the user input is received through a graphical user interface of an electronic device.

13. The method as described in claim 8, wherein the user input is a picture, and wherein the identification facilitating data is an object within the picture.

14. The method as described in claim 8, wherein the electronic message is selected from a group consisting of an electronic mail, and a text message.

15. A method comprising:
receiving a user input from a sender, wherein the user input identifies a physical object in a picture and is associated with a recipient of an electronic message and wherein the physical object is different from the recipient of the electronic message and further wherein the recipient of the electronic message is absent in the picture, and wherein a physical proximity of the recipient of the electronic message is independent from a physical proximity of the physical object, wherein the user input defines relationship of intended recipient of the electronic message to intended content of the electronic message, wherein the user input is different from an address of the intended recipient of the electronic message and wherein the user input is different from a name of the intended recipient;
resolving the user input against data stored at one or more servers to identify the address of the recipient of the electronic message;
receiving the intended content of the electronic message from the sender;
transmitting the intended content of the electronic message to the address of the recipient; and
applying permission logic rules to the identified address to apply restrictions associated with the electronic message, wherein the restrictions include a permitted time frame for transmission of the electronic message.

16. The method as described in claim 15, wherein the restrictions is selected from a group consisting of permitted time frame for transmission of the electronic message, content restrictions, geolocation coordinates, identity of the recipient, and mode of communication.

17. The method as described in claim 15, wherein the user input is selected from a group consisting of a picture, audio, geolocation coordinates, and natural language input.

\* \* \* \* \*